United States Patent [19]

Schaeuble

[11] E Re. 30,819

[45] Reissued Dec. 8, 1981

[54] METHOD FOR COATING USING AN OPEN-ENDED INK CHAMBER HAVING RESTRICTIONS FOR PARTIALLY LIMIT INK FLOW

[75] Inventor: Edwin K. Schaeuble, Green Bay, Wis.

[73] Assignee: Paper Converting Machine Company, Green Bay, Wis.

[21] Appl. No.: 170,544

[22] Filed: Jul. 21, 1980

Related U.S. Patent Documents

Reissue of:

[64] Patent No.: 4,091,129
Issued: May 23, 1978
Appl. No.: 797,459
Filed: May 16, 1977

[51] Int. Cl.[3] ..... B05D 1/28

[52] U.S. Cl. ..... 427/345; 118/203; 118/249; 118/259; 118/261; 118/DIG. 15; 427/428

[58] Field of Search ..... 427/345, 428; 118/203, 118/249, 259, 261, DIG. 15

[56] References Cited

U.S. PATENT DOCUMENTS

| | | | |
|---|---|---|---|
| 797,734 | 8/1905 | Hopkinson | 118/249 |
| 1,532,712 | 4/1925 | Orchard | 427/428 X |
| 1,558,271 | 10/1925 | Newell | 118/259 X |
| 2,151,968 | 3/1939 | Henderson | 101/157 |
| 2,502,795 | 4/1950 | Krasucki | 118/248 X |
| 2,918,899 | 12/1959 | Munton et al. | 118/259 X |
| 3,032,007 | 5/1962 | McCauliff | 118/259 X |
| 3,339,485 | 9/1967 | Rytterholm | 118/259 X |
| 3,539,384 | 11/1970 | Kolesinskas | 427/428 |
| 3,695,221 | 10/1972 | Schaeuble | 118/248 X |
| 3,747,561 | 7/1973 | Helm | 118/259 |
| 3,936,549 | 2/1976 | Kohler et al. | 118/259 X |

*Primary Examiner*—Shrive P. Beck
*Attorney, Agent, or Firm*—Tilton, Fallon, Lungmus & Chestnut

[57] ABSTRACT

A method [and apparatus] for coating wherein the horizontal flow of coating liquid is restricted adjacent the ends of the coating roll to overcome foaming by high flow rates of liquid flow while avoiding fouling of the roll journals.

9 Claims, 6 Drawing Figures

METHOD FOR COATING USING AN OPEN-ENDED INK CHAMBER HAVING RESTRICTIONS FOR PARTIALLY LIMIT INK FLOW

Matter enclosed in heavy brackets [ ] appears in the original patent but forms no part of this reissue specification; matter printed in italics indicates the additions made by reissue.

BACKGROUND AND SUMMARY OF INVENTION

This invention relates to a method [and apparatus] for coating and more particularly, to a method and apparatus pertaining to "fountainless" coating. As such, it constitutes an improvement on my prior U.S. Pat. No. 3,695,221.

In that patent, apparatus was described which reduced foaming in a fountainless, reverse angle doctor blade coater by promoting fast flow of the coating liquid to minimize the shearing action developed by the reverse angle doctor blade. This was achieved by employing a baffle or back wall of the liquid holding chamber closely adjacent the coating roll. The back wall was equipped with end walls that directed outflow of the excess liquid along the end faces of the coating roll. Wipers were installed to remove the coating liquid from the end faces to prevent liquid buildup and possible fouling of the journals. Although the apparatus of the patent was successful in eliminating the problem of foaming of the coating liquid (which could result in splotchy coating or printing), the artisans operating the machinery failed to maintain the wipers in proper fashion. For example, the wipers were not replaced when worn or not adjusted properly with the result that the coating liquid flowed along the roll end faces onto the journals and ultimately into the bearings.

To remedy this, I installed barrier strips between the chamber end walls and the roll end faces to prevent liquid flow onto the roll end faces. This resulted in the reduction of flow so that in some cases that the liquid tended to entrap air reaching a milk-shake consistency, viz., foaming.

To overcome the disadvantage of this expedient, I bored a hole in the lower portion of each end wall to achieve a higher flow rate of excess coating liquid and reduce the undesirable foaming. However, with the higher inputs to achieve higher flow rates, the liquid levels reached heights sufficient to spill over the barrier strips and again foul the journals.

I then decided that the end walls had to be eliminated to permit rapid outflow of liquid and thus avoid fouling of the roll end faces and journals. This was less than optimum because the coating was not uniform along the length of the coating roll. More particularly, it appeared that the fast outflow of liquid from the liquid holding chamber (an open-ended chamber) resulted in a liquid level that was not uniform across the face of the roll. Thus, the end portions of the roll and hence the edges of the web being coated were literally "starved" of the coating liquid.

I then experimented with a partial end wall, i.e., one that did not completely close the gap but this, although correcting the liquid level problem, brought about again the problem of roll end face fouling. This situation was further aggravated by the fact that liquid would build up in the form of a bead or annulus at the end of the roll and thus leave an unacceptable trace on the web.

I then discovered that the problems of foaming, nonuniformity of coating, undesirable beading and roll end face fouling all were solved by interposing a restriction to the horizontal outflow of excess coating liquid at a critical location within the fountainless chamber. In particular, the restriction is located slightly inwardly of the ends of the roll and provides a substantially uniform liquid level in contact with the roll along the length thereof while eliminating foaming, beading and roll end face fouling. The latter is particularly important because the wipers could be omitted.

Other details of the invention including other objects and advantages may be seen in the ensuing specification.

DETAILED DESCRIPTION

The invention is described in conjunction with an illustrative embodiment in the accompanying drawing, in which -

Figure 1:
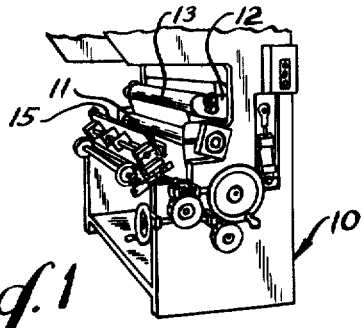
FIG. 1 is a fragmentary perspective view of apparatus embodying the teachings of this invention.
Figure 2:
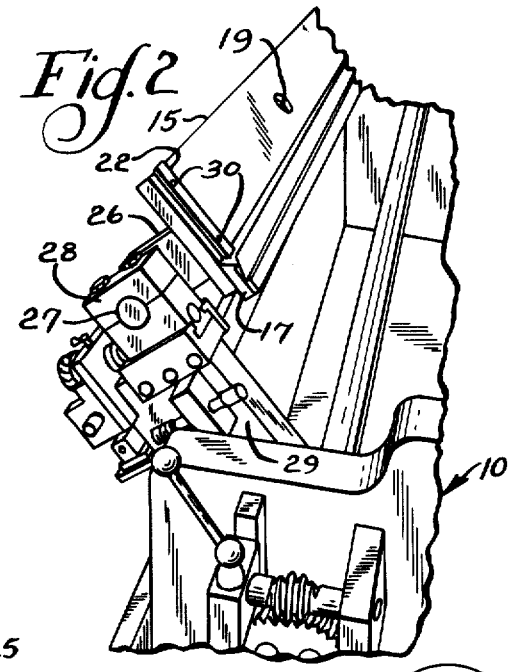
FIG. 2 is an enlarged fragmentary perspective view (taken from a slightly different angle) of the apparatus of FIG. 1.
Figure 3:
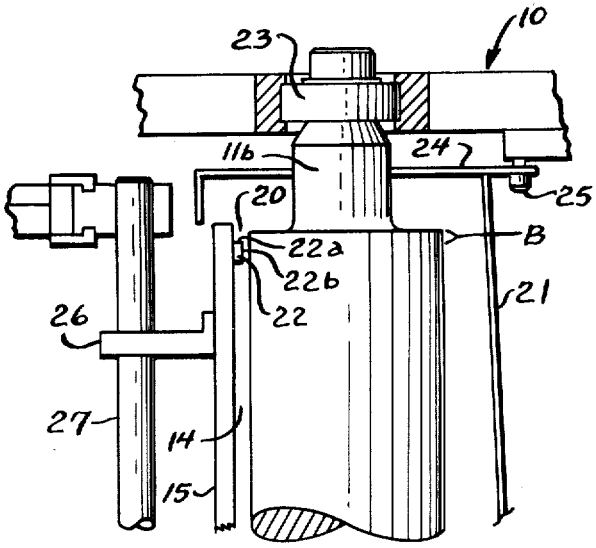
FIG. 3 is a fragmentary end elevational view of the chamber and roll portion of FIG. 1.
Figure 3:
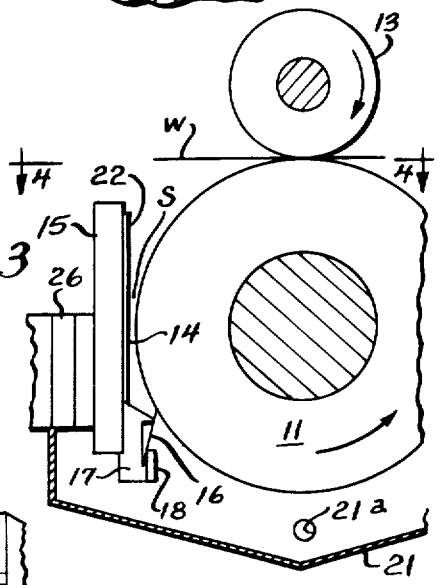

In the illustration given and with reference first to FIG. 1, the numeral 10 designates generally the frame of the machine for coating a web W (designated in FIG. 3). The means for applying the coating liquid to the web W includes a coating roll 11 which is suitably journalled in the frame 10 for rotation. The frame 10 also pivotally supports as at 12 (see FIG. 1) a back-up roll 13 (also designated in FIG. 3). A chamber 14 (see FIGS. 3 and 4) is provided for supporting the coating liquid to be applied to the web W. The chamber 14 is defined in part by a back or rear vertical wall 15 which, in FIGS. 1 and 2 is shown in a stand-by or cleaning condition, i.e., the wall 15 has been pivoted away from its close adjacency to roll 11 as illustrated in FIGS. 3 and 4.

Referring to FIG. 3, the numeral 16 designates a doctor blade of the "reverse angle" type and which is provided as part of the rear vertical wall 15. More particularly, a holder 17 is suitably attached to the lower portion of wall 15 for the purpose of mounting the doctor blade 16. A clamping plate 18 secures the doctor blade 16 to the holder 17. Thus, the assembly consisting of the elements 16–18 effectively closes the bottom of the chamber 14 except to the extent that a thin film of liquid is metered onto the roll 11 by the doctor blade 16. Advantageously, the doctor blade 16 can be constructed of flexible plastic material so as to be readily replaceable while being clamped in substantially immobile position on the holder 17. It should be noted, however, that the ends of the chamber 14 are open so that liquid introduced into the chamber 14 through the inlet 19 in the rear wall 15 (see FIG. 2) can exit through the end spaces 20 (see FIG. 4). Coating liquid exiting through the end openings 20 is captured in the pan 21 and is recirculated via a pump (not shown) from the outlet 21a to the inlet 19.

Figure 4:
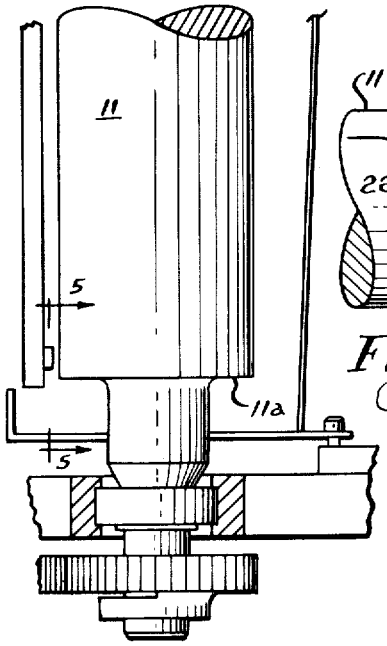
FIG. 4 is a fragmentary top plan view of the apparatus of FIGS. 1–3.

The advantageous flow restriction of the invention is provided in the illustrated embodiment by means of inserts 22 provided adjacent the ends of the vertical wall 15 (compare FIGS. 2 and 4). I have found that the placement of the inserts 22 is critical to achieving the benefits of the invention. For example, in one specific coater having a roll length of about 1.5 meters, the outboard end 22a of each specific insert 22 should not be less than about 8 to 10 mm. from the end face 11a of the roll 11 (see FIG. 4). Should the outboard end of the specific insert 22 (which is 20 mm. wide and 7 mm. thick) be closer to the end wall 11a, I found that the coating liquid flows along the end faces 11a of the roll 11 and onto the journals 11b and thence into the bearings 23. Also a lesser spacing does not eliminate the undesirable beading. A typical bead B is shown in the upper right hand portion of FIG. 4.

Figure 5:
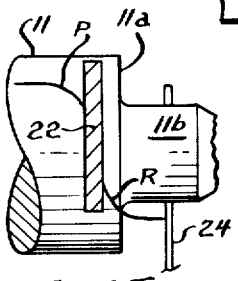
FIG. 5 is a fragmentary rear elevational view taken along the line 5—5 of FIG. 4.

Although the mechanism by which the invention operates is imperfectly understood, it is believed (on the basis of observation) that a unique liquid flow pattern is achieved which is described in conjunction with FIG. 5. There, one end portion of the roll 11 and its associated insert 22 are shown. The profile P of the upper excess liquid is seen to be within the confines of the roll 11 and at the bottom merges as at R into the main body of outflowing excess liquid. This conducts the upper excess liquid away from the end face 11a of the roll 11 to prevent fouling thereof—while maintaining flow rate above the level productive of foaming.

Also assisting in developing the advantageous liquid stream exiting through the lower portion of each open space 20 is the spacing of the pan end walls 24 from the roll end faces 11a—of the order of about 60 to 75 mm. in the illustrated embodiment—thereby avoiding splash back. The pan end walls 24 are secured to the frame 10 by bolts 25.

I have also found it advantageous to project the vertical wall 15 a distance outboard of the end wall 11a of the roll 11. In one preferred embodiment, this projection is of the order of 5 to 10 mm.

For optimum performance, I have found it important to maintain a minimal spacing between the confronting face 22b of the insert 22 and the closest point of the periphery of the roll 11. For most coating liquids (those having viscosities in the range of 10 to 100 centipoise—printing and flexigraphic inks and acrylic lacquers) the spacing S (see FIG. 3) should be of the order of about 2 to 3 mm. For higher viscosity coating liquids such as those having viscosities in excess of 100 centipoise, the spacing S can be increased as by partially pivoting the rear wall 15) to the order of about 5 to 8 mm. In this manner, I can quickly vary the restriction of flow to compensate for change in viscosity. However, other types of restricting inserts 22 may be employed which provide this adjustable feature. Advantageously, the inserts 22 are constructed of resilient plastic material so that should the adjustment of the spacing be incorrect and the insert hits the roll 11, no damage occurs.

For a given installation, the inserts 22 should have a width and thickness (in conjunction with spacing from the roll end) to develop the profile P, not one that curls around the roll 11 and onto the end face 11a. The length of the inserts 22 is such as to extend above the liquid level and the confronting face of each insert 22 may be contoured by thickening, if desired, to conform to the periphery of the roll 11. However, no great advantage is achieved by this and the simpler flat, thin inserts are preferred for purposes of economy and ease of adjustment. For example, I have found that the inserts 22 are effective to maintain a level which is uniform above the doctor blade 16 of the order of 50–80 mm. when running at web speeds of about 350 meters per minute. Above that speed, slightly higher liquid levels above the doctor blade 16 are required to prevent starvation of the edge portions of the web W. The flow rates suitable for most conventional coating operations are in the range of 5 to 40 liters per minute depending upon the machine size, receptivity of paper, viscosity, etc.

In the practice of the invention, the rear vertical wall 15 is pivoted out of its close adjacency to the roll 11, i.e., to the position depicted in FIGS. 1 and 2. For this purpose, the wall 15 is equipped with brackets as at 26 (see FIGS. 2–4) which are fastened to a pivot shaft 27. The pivot shaft 27 in turn is carried by blocks 28 carried by pivot arms 29. The inserts 22 can be installed by means of countersunk bolts as at 30 (see FIG. 2) so that their position in spacing relative to the roll 11 is optimized. Thereafter, the wall 15 is pivoted to the position seen in FIGS. 3 and 4 and coating liquid introduced into the chamber 14. A web W passes through the nip between rolls 11 and 13 and is coated in controlled fashion by the amount of coating liquid permitted to adhere to the roll 11 when the same passes by the doctor blade 16. Excess coating liquid exits through the end spaces 20 and is collected in the pan 21 for recirculation (usually with filtering) through the outlet 21a.

As pointed out previously, the inserts 22 through their unique positioning perform several functions simultaneously. First, the inserts are responsible for maintaining a reasonably level profile or level of coating liquid across the face of the roll 11, thereby avoiding starvation of the edges of the web W. The inserts are also responsible for causing the upper recess liquid to follow the profile P and exit out of the lower parts of open spaces 20 rather than flowing around the edge of the roll 11 and onto the end faces 11a. At the same time the squirting or shearing action developed by the exiting coating liquid effectively eliminates any tendency of the ink to bead as at 23 in FIG. 4.

Figure 6:
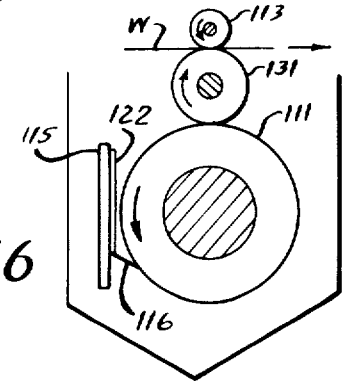
FIG. 6 is an end elevational view (essentially schematic) of a modified form of the invention.

The invention is not restricted to the use of reverse angle doctor blades but also finds advantage in conjunction with conventionally mounted doctor blades as is illustrated schematically in FIG. 6. There, the numeral 111 designates the metering roll which coacts with a conventional doctor blade 116. The inserts are designated by the numeral 122 and are seen again to be provided as part of the rear vertical wall 115. In the illustration given in FIG. 6, offset printing is illustrated in that a transfer roll 131 is interposed between the metering roll 111 and the backup roll 113. In the illustration given in FIG. 6, the web W is traveling to the right so that its travel parallels that of the contacting portions of the rolls 113 and 131 to provide "direct" rotational coating. In the instance of the illustration given in FIG. 3, the web W is again traveling to the right but because of the different rotation of the roll 11, is passing counter thereto and thus illustrates the applicability of the invention to reverse rotational coating. Thus, the doctor blade may be reverse angled or conventional and the relation of the applicator roll to the web may be either direct or reverse, all while still retaining the beneficial advantages of the invention.

While in the foregoing specification, a detailed description of the invention has been set down for the purpose of explanation, many variations in the details hereingiven may be made by those skilled in the art.

I claim:

1. In a method for applying a liquid coating to a moving web by applying ink to a rotating roll for transfer to said web, the steps of introducing a coating liquid generally centrally of a horizontally elongated chamber having said roll mounted for rotation therein while positioning a vertical chamber wall closely adjacent to said roll, said wall adjacent the bottom thereof being equipped with a doctor blade for metering liquid to said roll, the improvement comprising applying said coating liquid to said web while partially restricting the flow of liquid horizontally along said wall slightly inward of the ends of said roll to provide a substantially uniform liquid level in contact with said roll along the length thereof while avoiding both foaming of liquid and fouling the roll end faces said partially restricting including the positioning of barrier inserts at least about 2 mm away from the ink applying surface of said roll collecting the liquid flowing past said roll ends and reintroducing the same into said chamber.

2. The method of claim 1 in which the restriction of the flow occurs at least about 8 to 10 mm. inward of the roll ends.

3. The method of claim 1 in which said blade is oriented to provide a scraping action relative to said roll.

4. The method of claim 1 in which said blade is oriented to provide a wiping action relative to said roll.

5. The method of claim 1 in which said web is moving in the same direction as the portion of the roll in contact therewith.

6. The method of claim 1 in which said web is moving in a direction opposite to the direction of the portion of the roll in contact therewith.

7. The method of claim 1 in which said web is in contact with a portion of said roll.

8. The method of claim 1 in which a second rotating roll is interposed between the first mentioned rotating roll and said web to provide offset coating.

9. The method of claim 1 in which the restricting offflow is varied as a function of the viscosity of the liquid.

[10. Apparatus for applying a coating liquid to a moving web comprising a frame, a roll rotatably mounted in said frame to transfer coating liquid to said web, said frame being equipped with a horizontally elongated chamber adjacent the lower portion of said roll for partially confining said coating liquid, said chamber including a vertical wall positioned closely adjacent said roll, said wall adjacent the bottom thereof being equipped with a doctor blade for metering coating liquid to said roll, said wall adjacent the roll ends but slightly inward thereof being equipped with restriction means to partially limit the flow of liquid coating horizontally to maintain a substantially uniform level in contact with said roll along the length thereof while avoiding both foaming of liquid and fouling the roll end faces, said restriction means including inserts positioned at least about 2 mm away from the ink applying surface of said roll and collection means operably associated with said chamber for collecting the liquid flowing past said roll ends and for reintroducing the same into said chamber.]

[11. The apparatus of claim 10 in which a liquid receiving pan constituting said collection means is provided about the lower portion of said roll, said pan having end walls spaced at least 60 mm. from the adjacent end faces of said roll.]

* * * * *